Aug. 29, 1939.   B. E. SMITH   2,170,836
VARIABLE SPEED DYNAMO-ELECTRIC POWER TRANSMITTING AND CONVERTING DEVICE
Filed April 2, 1935   6 Sheets-Sheet 2

INVENTOR.
Byron E. Smith
BY
ATTORNEY

Aug. 29, 1939.  B. E. SMITH  2,170,836
VARIABLE SPEED DYNAMO-ELECTRIC POWER TRANSMITTING AND CONVERTING DEVICE
Filed April 2, 1935  6 Sheets-Sheet 4
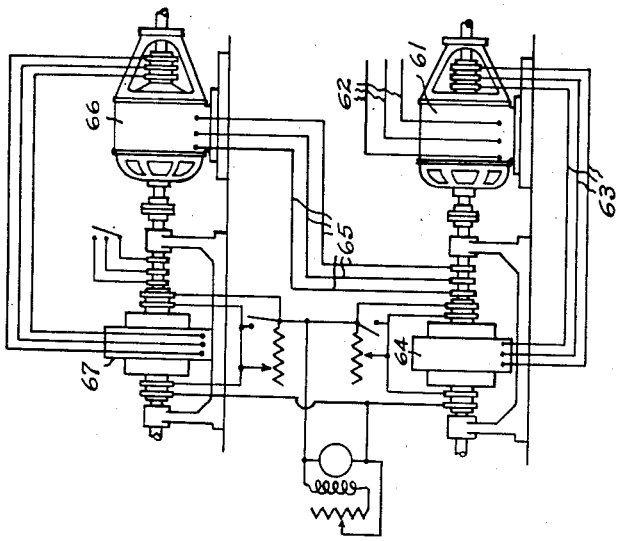
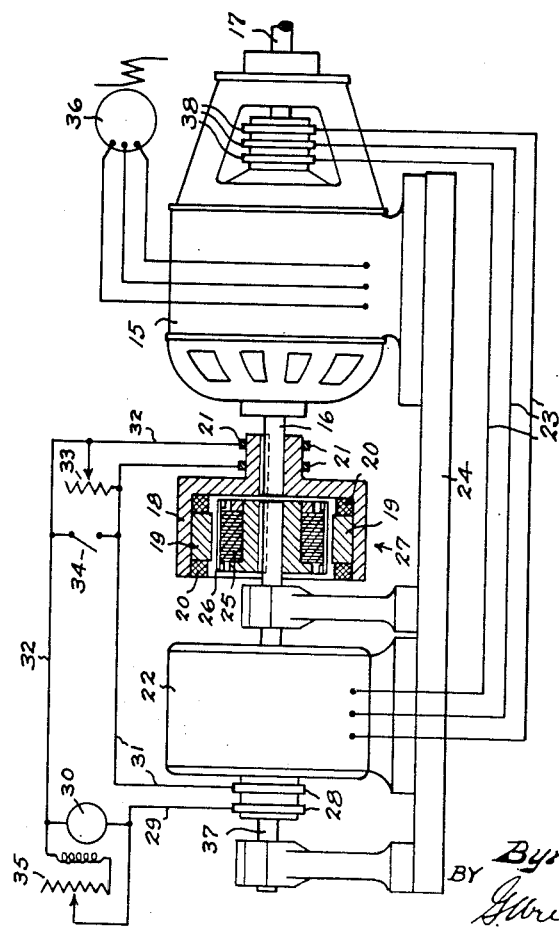
INVENTOR
Byron E. Smith
BY
*[signature]*
ATTORNEY

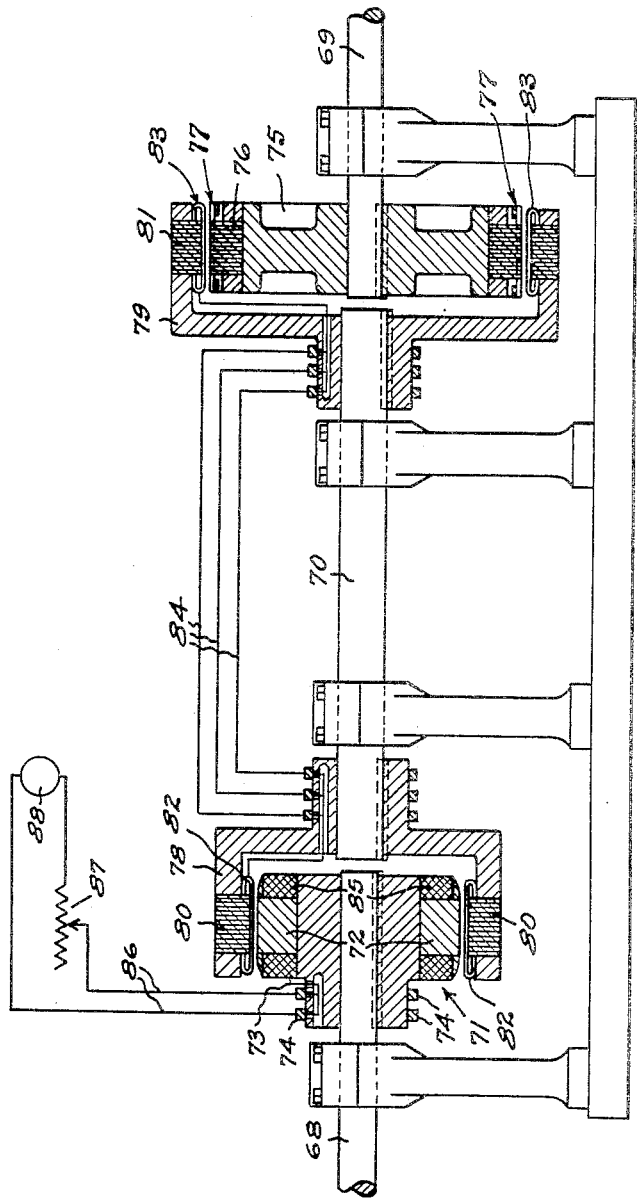

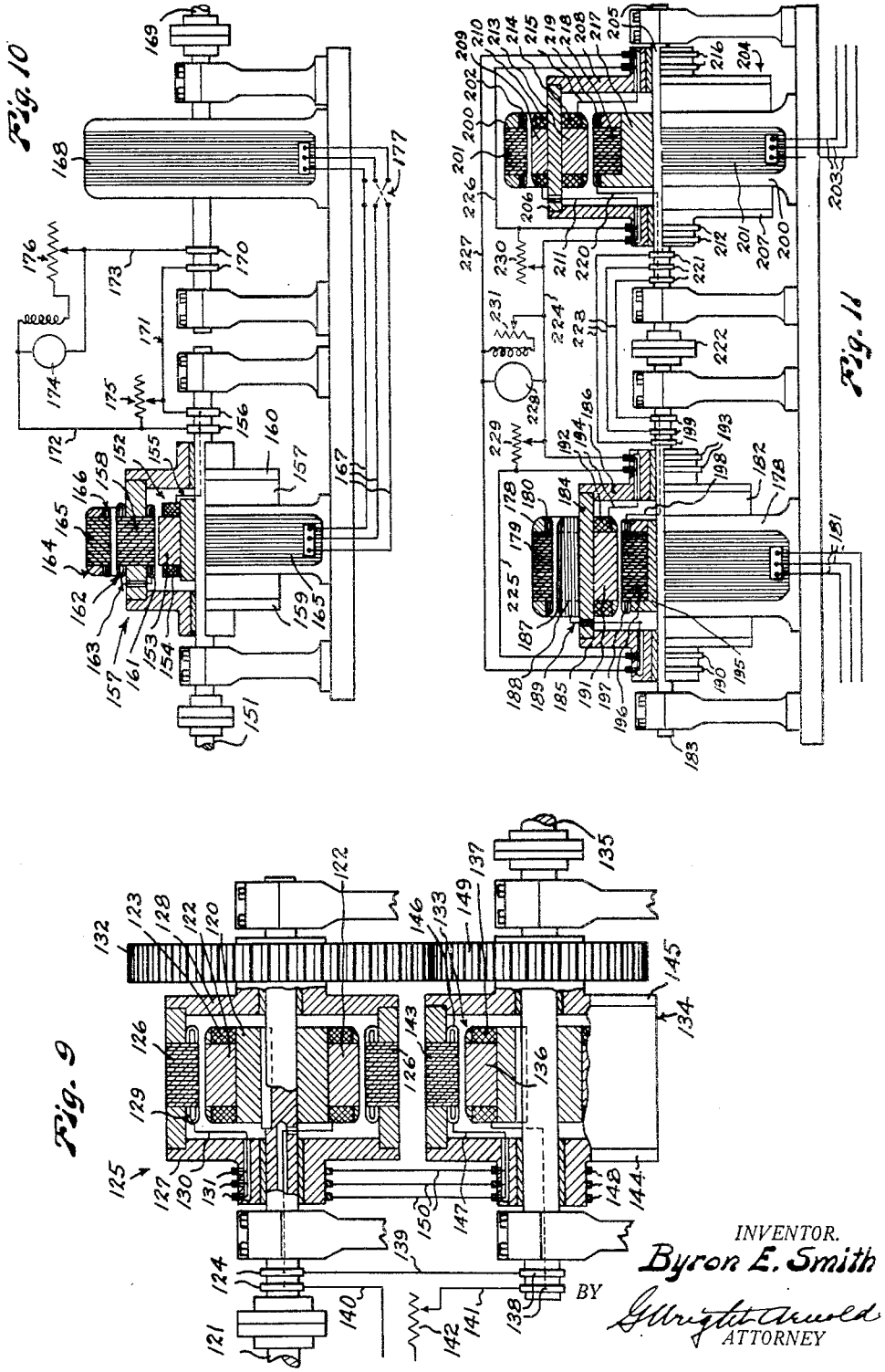

Patented Aug. 29, 1939

2,170,836

UNITED STATES PATENT OFFICE 2,170,836

VARIABLE SPEED DYNAMO-ELECTRIC POWER TRANSMITTING AND CONVERTING DEVICE

Byron E. Smith, Ketchikan, Territory of Alaska; E. C. Wooster executor of said Byron E. Smith, deceased Application April 2, 1935, Serial No. 14,292

8 Claims. (Cl. 172—237)

This invention relates to an adjustable load regulation of alternating current rotary field machines. More particularly, it relates to and improved and more economical adjustable control over load current, torque and power factor in such machines and to circuits and apparatus therefor.

This machine is especially characterized by smoothness of operation, by a nice but positive control over general performance and by improved economy at speeds other than synchronism by reason of more efficient disposal of the slip energy. These characteristics render it peculiarly adaptable to applications in which units of considerable power are required to function for extended periods under heavy loads at speeds other than synchronism or under service conditions involving frequent starting or stalling under load, and especially to installations where two or more machines collectively grouped, like the driving motors of an electric railway locomotive, are required to operate as a unit under such conditions.

No type of electric motor or system of electric drive in present common use is generally satisfactory under operating conditions outlined above. All involve a number of gravely objectionable features. Alternating current rotary field machines as heretofore designed are capable of operating efficiently at only one speed. Induction motors of the familiar slip ring type commonly employed under such service conditions are deficient in two vital respects when required to function through a wide range of speed and load, viz., they have, in the first place, no satisfactory means of opposing to the impressed electro-motive force, a variable, internal, counter electromotive force in phase therewith and adjustable independent of the load speed, whereby, at any convenient speed, the flow of load current from the supply circuit may be regulated at will to yield any required torque. Further, they afford no means of conserving the slip energy at fractional speeds and applying the same to any useful purpose, but in general dissipate this energy wastefully in grid resistors. In addition to the above, the induction motor always operates with a lagging power factor with well known undesirable effects upon the operation of the supply system. To overcome all these difficulties is the general object of this invention, and in so doing, to provide an improved system of electric drive, employing alternating current motors of the rotary field type, which may receive their power from supply circuits of standard voltage and frequency; requiring neither resistors nor commutators in any circuit other than that of a relatively small direct current exciter; yet, with excellent power factor and economy, providing a nicely adjustable regulation of load current and torque conveniently governable at all load speeds by merely varying the intensity of a magnetic field. By employing apparatus embodying this invention alternating current machines of the rotary field type may be operated through a wide range of speeds with power factor and economy comparable to that of the synchronous machines in present practice and with motor characteristics especially satisfactory under starting and overload conditions, including high torques with good economy at low speeds, and a positive but precise regulation, similating the well known elasticity of control available only by the use of steam in multiple cylinder reciprocating engines or by the use of direct current motors controlled by the well known Ward-Leonard system. To this end I propose to resolve an alternating current machine of given required capacity into a plurality of smaller constituent machines, each of which is adapted to serve a distinctive peculiar novel and necessary function, all co-ordinated and interconnected mechanically and electrically so that the group may be controlled and operated as a unit.

The procedure above indicated is analogous in several interesting respects to the division of the compound steam engine into high, intermediate and low pressure cylinders. It is pertinent and instructive to observe that the peculiar operating characteristics for which such an engine is chiefly notable and valued are not at all to be found in the simple, single acting engine, which in fact, is no better adapted to start under heavy load or run at low speed than is the present simple electric motor, but is liable to stall on dead center, and once so stalled, is quite helpless. The rugged yet flexible dependability which we commonly associate with steam is attainable only when the engine has been resolved into two or more cylinders, each preferably double acting, assembled and co-ordinated so that they supplement one another, cooperating to produce a smooth resultant flow of controlled power. Such an engine is said to be compounded. Similarly, it is a primary purpose of this invention to provide a method of compounding the alternating current motor by resolving it into a group of two or more members, all of which may be of the rotary field type, the several members being so adapted and coordinated electrically and mechanically that they serve to correct each other's deficiencies, each converting a certain portion of the supplied energy into useful effort upon the load and at the same time serving a peculiar function necessary to the maintenance of a smooth and economically controlled flow of power; so that the whole assembly constitutes an operative unit having a total capacity equal to the sum of the capacities of the several members and a natural or synchronous speed determined by the total number of poles in all the members and the distribution thereof among the members.

To function as one of the constituent members of such a group, I provide a device hereinafter designated as a regulating or regulator member. As an approach to the understanding of this regulator, it may be helpful to regard it, in general, as an improved and modified slip ring induction motor, characterized by having in its preferred form a convenient and effective means of regulating load and power factor in both circuits.

I further provide such a regulator, which by virtue of this inherent capacity for load and power factor control is admirably adapted to operate in "cascade" connection, in combination with any number of other alternating current machines of the same or different types, grouped for collective drive, like the motors of a street car. This feature renders practicable in alternating current practice, the development of large torques at low speeds with relatively small supply current and also effective regenerative braking at relative low speeds. These two desirable characteristics have long been realized in direct current practice by series connection of several motors, but prior to the present invention, such desirable characteristics in alternating current practice have not been obtainable on account of power factor difficulties.

To serve as an additional constituent member of the coordinated group hereinabove referred to, I further provide a device hereinafter designated as a differential member. This member is particularly adapted to conserve slip energy derived from the secondary terminals of the regulator member and apply such energy with good economy as useful effort upon the load.

A further object of my invention is to provide a type of motor better adapted than any in present common use to drive heavy hoists, dredges, logging engines and particularly towing engines, such as are used on off-shore towing vessels to maintain on a tow line approximately stationary an elastic strain of approximately constant average tension, and for other similar services requiring positive but delicate control over torque at any speed, and for which, in present engineering practice, steam is the only available satisfactory drive. In short, I purpose providing an alternating current motor capable of satisfactorily replacing steam power in its present own peculiar field.

Another object of my invention is to provide a method and a means more satisfactory than any in present use, for establishing and regulating a measured, directed flow of power between two independent alternating current power systems, free from derangement or disturbance due to any casual difference in phase or variations in frequency between the systems.

The weight and cost of standard generating and transforming equipment varies inversely as the frequency at which they operate. At 60 cycles a given machine has approximately twice the capacity it has at 30 cycles. Due largely to starting characteristics of present motors, however, many great power systems serving large motor loads operate at 25 or 15 cycles. It is one purpose of this invention to provide a type of motor better adapted to satisfactory operation on power circuits of any commercial frequencies, including standard 60 cycle and higher.

In short I provide a compound alternating current motor of the rotary field type, the regulation of which may be so nicely governed by merely adjusting an exciter field, that the driven shaft may be brought to rest practically without load or may be started from rest under overload, in either case with full line voltage impressed upon the primary motor terminals but without undue heating of the apparatus, wasteful dissipation of energy or disturbance of the supply circuit and without the use of resistors, commutators or switching operations in any alternating current circuit to control the flow of current therein.

The above mentioned general objects of my invention, together with others inherent in the same, are attained by the devices illustrated in the following drawings, the same being preferred exemplary forms of embodiment of my invention, throughout which drawings like numerals indicate analogous parts:

Fig. 6 is a front elevation, with parts in section, and with parts illustrated diagrammatically, of a modified form of the invention, showing a simple form of regulating device in combination with a slip ring motor;

Fig. 7 is a somewhat diagrammatic front elevation view indicating several regulators and induction motors connected in cascade for collective drive;

Fig. 8 is a view in elevation, with parts shown in section, and parts broken away, of another modified form of the invention, showing a simplified form of the differential device;

Fig. 9 is a view in elevation, with parts shown in section, and parts broken away, of another modified form of the invention, showing a driving shaft and a driven shaft dynamically coupled together through a modified form of the differential in which the two mounting members thereof are differentially linked through gears of unlike pitch diameters;

Figure 1:
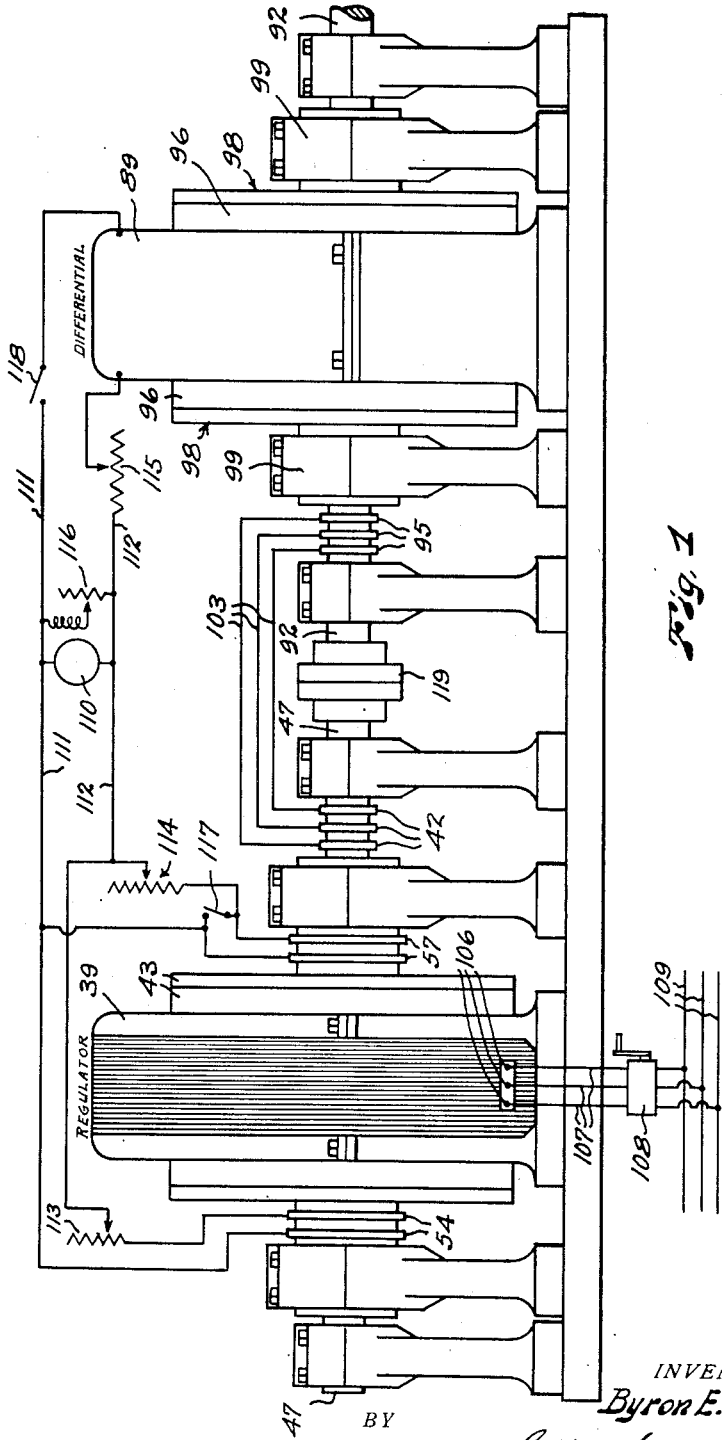
Figure 1 is a view in front elevation of a compound unit embodying my invention, showing a regulator member and a differential member mechanically and electrically co-ordinated, with the electrical circuits indicated diagrammatically.

Fig. 10 is a view in elevation, with parts shown in section, and parts broken away, of another modified form of the invention, showing a differential member electrically connected with a synchronous machine providing a variable speed ratio between a driving and a driven shaft; and Fig. 11 is a view in elevation, with parts shown in section and parts broken away, of another modified form of this invention, showing two regulators with their load shafts coupled together, but wound respectively with unequal numbers of poles, so that their respective control rotors turn with unequal rotative speeds.

The regulator and differential machines in the preferred forms here illustrated are respectively two novel types of alternating current apparatus, differing in certain respects from ordinary synchronous and induction machines and from each other, but they are mutually supplementary. In several forms of embodiment a machine of either type may be operated with good economy as a constant speed machine in place of an ordinary induction machine at approximately synchronous speed. A machine of either type is further adaptable to certain useful applications in combination with other alternating current machines in "cascade". In combination with each other, however, properly co-ordinated they together constitute, like a multiple cylinder steam engine, a single compound operative unit embodying a number of unique and highly desirable characteristics, which, in the present state of the art are practically unattainable in alternating current practice.

Referring to Fig. 6, this view illustrates a machine which I have built and tested. While certain structural features of this embodiment are hardly adaptable to units of large capacity involving heavy revolving masses, yet the several parts, of which this particular device is composed, are either standard equipment or so similar thereto that the function and nature of each is easily understood to one skilled in the art. This form, therefore, lends itself readily to clear explanation and is here considered at some length.

In this figure, 15 is an induction motor of the common slip ring type with no unusual features whatever, other than an extended shaft 16. One end 17 of that shaft 16 is mechanically connected to the driven load (not shown) and upon the other end is fixed a mounting member consisting of an annular shaped spider 18, scupporting on its inner surface, a set of inwardly pointing poles 19, provided with an exciting winding 20. The terminals of this exciting winding 20 are led to slip rings 21 on the hub of the spider 18. This set of poles 19 and winding 20 is hereinafter designated as the loader field.

22 represents a synchronous motor, which acts as a condenser and is so hereinafter termed. This condenser is of the common salient pole, revolving field type having pole tips provided with the customary squirrel cage starting winding. The stator or armature winding of this condenser is specially wound to match the secondary winding of the motor 15 in volt ampere capacity and these two windings are electrically connected through the conductors 23. Care should be taken so that the leads are so attached that when an alternating current is impressed upon the primary terminals of the motor 15, the phase rotation in the stators of the motor 15 and the condenser 22 will be in the same direction. The motor 15 and the condenser 22 are assembled on a common base 24 with their shafts carefully adjusted in line and freely rotatable with respect to one another. Rigidly mounted on the end of the shaft of the condenser 22 is a cylindrical laminated magnetic core 25 fitted with a squirrel cage winding 26 and similar in all respects to the rotor of an ordinary squirrel cage induction motor. This squirrel cage winding 26 is operatively disposed in close inductive relation to the loader field 20. A loader couple, generally referred to by 27, comprises the squirrel winding cage winding 26 and the loader field 19—20 and forms a magnetic link connecting the shaft of the condenser 22 with that of the motor 15. The exciting winding 20 of the loader field and that of the condenser field are connected in series to a source of direct current. A conductor 29 connects a source of direct current as exciter 30 with slip rings 28, which are connected with the field of the condenser 22. A conductor 31 connects the slip rings 28 with the slip rings 21 of the winding 20. A conductor 32 connects the slip rings 21 with the source of direct current as exciter 30. Preferably a small shunt 33 connects conductors 31 and 32, permitting relative adjustment of the excitation of the winding 20 as respects the excitation of the field of the condenser 22. A short circuiting switch 34 is also preferably interposed between the conductors 31 and 32, permitting complete deenergizing of the winding 20 without completely deenergizing the field of the condenser 22.

After the relative strength of the field of the winding 20 and field of the condenser 22 has been adjusted, all ordinary load regulation is then readily effected by varying a small resistance 35 in the field of the exciter 30, thereby varying the output of said exciter.

Assume for purposes of discussion that the motor 15 and the condenser 22 have each 8 poles, that the end portion 17 of the shaft 16 is mechanically coupled to a load of considerable starting torque. Assume further, that the condenser 22 is entirely without mechanical load and free to turn—the winding 20 being for the moment short circuited by the switch 34. If then, the primary terminals of the motor 15 are connected to a source of 60 cycle alternating current, indicated by 36, its shaft 16 being held at rest by the load, the motor 15 will function as a simple transformer, delivering to the condenser 22 through conductors 23, the currents induced in its secondary. The condenser 22 being without load will promptly start and accelerate excatly as if it were connected to the supply circuit direct. During acceleration of the condenser 22, the motor 15 will develop a considerable torque, due to the presence in its windings of an appreciable current drawn by the condenser 22 from the supply circuit. As the condenser 22 approaches synchronism, both current and torque in motor 15 will drop sharply. If the condenser field be then excited by direct current (the winding 20 being still short circuited), and adjusted to give unity power factor through conductors 23 in the secondary circuit of the motor 15, the condenser 22 will run without load in synchronism with the secondary frequency, and the supply current and the torque developed thereby in the motor 15 will fall to a minimum value.

So precise and delicate is the regulation of load current and torque in the motor 15 attainable by this method (as has been demonstrated by actual test under the above conditions—condenser running light with unity power factor and the loading coil short circuited (unexcited)), that this minimum current line through the motor 15 will in general be so slight, that with all external load disconnected from the shaft 16 of the motor 15, and with full line voltage impressed upon the primary terminals thereof, the torque will scarcely be sufficient to start the unloaded shaft 16 from rest. Any appreciable additional load however, even the pressure of a finger applying friction to the spinning shaft of the condenser 22 will sufficiently increase the supply current drawn by transformer action through the windings of the induction motor 15 that the increased torque developed thereby will promptly cause the unloaded shaft 16 to start and accelerate.

On the other hand, in order to start the motor 15 under an overload, any necessary torque within the capacity of the apparatus may be developed in this way, by merely applying sufficient mechanical load to the spinning shaft 37 of the condenser 22. It is apparent that, with loaded condenser 22 running with unity power factor, any given value of secondary current drawn thereby through conductors 23 from the slip rings 38 of the motor 15 will develop in that motor a torque not less than that developed therein when a similar value of current is absorbed by grid resistors attached to the same slip rings 38 in the usual manner. Further, the instant availability of this method of load regulation is quite independent of any change in the state of rest or motion of the loaded shaft 16 and the torque that may in this manner be developed in the motor 15 is limited only by the maximum load the condenser 22 can carry without dropping out of step.

Thus far in this discussion, only the torque developed in the motor 15 has been considered, the condenser 22 being loaded mechanically and the winding 20 short circuited by closed switch 34. Upon removing this short circuit it is obvious that any desired load may be conveniently put upon the condenser 22 by varying the excitation of the winding 20. By this loading, the torque of the condenser 22 is carried over and added to that of the motor 15 in turning effort upon the load. The loader couple 27 should be large enough to adequately load the condenser 22 but not large enough to overload it to the point of causing it to drop out of step. With this provision, any torque within the capacity of the apparatus may be applied to a heavy starting load without disturbance of the supply circuit or danger to the apparatus even though the load is stalled and full voltage impressed upon the primary terminals of the motor 15. When the necessary torque has thus been developed, the loaded shaft 16 will start and accelerate, the secondary frequency will drop, and the condenser speed will drop in synchronism with that frequency until the condenser 22 and the motor 15 are turning at approximately the same speed, which, since both machines have 8 poles, will be approximately 450 R. P. M. Above this speed, the group so connected will not accelerate, but if driven mechanically at a higher speed will regenerate like any induction machine driven above synchronism but with greatly improved power factor. At all speeds above synchronism, or below, the torque and load current may be governed at will by varying the excitation of the winding 20. The group thus obviously constitutes a single compound operative unit functioning as a motor having a maximum available torque and synchronous speed of a motor of 16 poles but operable with unity power factor and with characteristics found in no other motor whatever.

From the foregoing, it appears that an alternating current motor fitted with such a suitable loading couple and introduced into the circuit of an induction motor provides an effective means of inducing in that circuit a variable internal counter electro-motive force, opposed to the impressed electro-motive force and in phase therewith whereby load and power factor may be nicely regulated with a precise control over torque and speed and general performance. Such a combination, adapted to control load current at any load speed, is herein called a regulator. A preferred form of such a regulator is represented in Figs. 1, 2 and 3.

Figure 2:
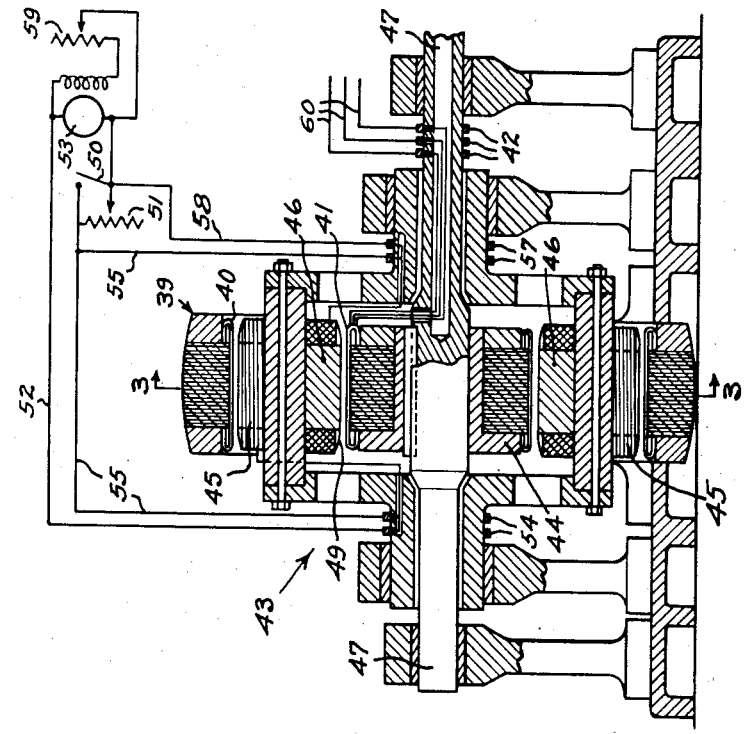
Fig. 2 is a vertical longitudinal sectional view of the regulator member shown in Figure 1, with parts in elevation and with the electrical circuits indicated diagrammatically.
Figure 3:
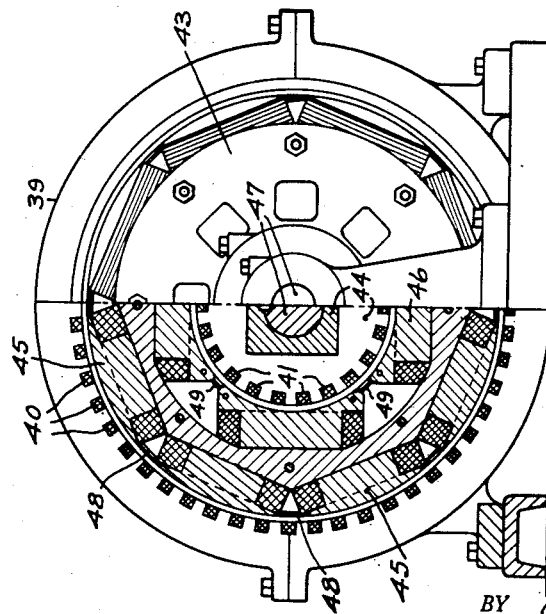
Fig. 3 is a view partly in section and partly in elevation on broken line 3—3 of Fig. 2.

The regulator shown in Figs. 2 and 3 in general, is somewhat similar to a slip ring induction motor. It has a stator 39 with a primary winding 40 of the distributed polar type similar to the primary of any induction motor of similar power rating. It has also a secondary winding 41, like the secondary winding of a slip ring induction motor, with terminals brought through the hollow shaft to slip rings 42 on the shaft. Unlike the ordinary slip ring motor, however, these two windings are not in inductive relation to each other and therefor need not necessarily be wound with the same number of poles. Operatively interposed between them is an intermediate drum shaped rotor 43, hereinafter designated as the control rotor. This control rotor is freely rotatable with respect to both the stator 39 and the load rotor 44, and it is fitted with two sets of field poles excitable by direct current. One of these sets of poles, hereinafter designated as the condenser field 45, is disposed in inductive relation to the stator primary winding 40 like the field and armature of any synchronous machine. These two winding elements in combination constitute a dynamo electric couple and may be designated as the condenser couple. Another set of field poles, herein called loader field 46, is mounted upon the control rotor 43 and operatively disposed in close inductive relation to the secondary or loader winding 41, like the field and armature of a synchronous alternator. This pair of winding elements constitutes another dynamo electric couple and may be designated as the loader couple. In operation the control rotor 43 will revolve in synchronism with the alternating current impressed upon the primary winding 40 of the regulator, and if the frequency of that current varies, the rotative speed of the control rotor 43 will vary accordingly. If the secondary or loader winding 41 be closed through an outside circuit connected across the slip rings 42, as long as the control rotor 43 turns with a different velocity than the driven or loaded shaft 47, any desired load may be thrown on the apparatus by merely varying the excitation of the loader field 46. In this particular form of regulator, either of the distributed polar windings 40 or 41 thereof, with its proper field may function as the primary or condenser couple, and the other as the secondary or loader couple. In this respect these couples are interchangeable, the principal difference being that in case the two couples have unequal numbers of poles, there will be a corresponding difference in the speed of the control rotor and in the relative frequencies of the primary and secondary circuits. Both fields will be fitted with squirrel cage starting windings 48 and 49 upon their pole tips as is usual in self starting synchronous motors. In this preferred form of regulator both sets of field poles 45 and 46 have been mounted upon the control rotor. It is obvious that the relative positions of winding elements of either couple is immaterial and may be reversed without modifying the operation of the device. It is desirable that these two fields 45 and 46 be connected together in circuit so that, aside from minor adjustments in either, the strength of the two will vary more or less in unison, otherwise, for instance, if a heavy load were suddenly thrown on without stiffening the condenser field 45, such field might be thrown out of step; or if the load is suddenly thrown off without weakening the condenser field 45, the control rotor 43 will "hunt" as will the rotor of any overexcited synchronous motor under light load. In certain cases it may be desirable to provide a switch 50 or other means of short circuiting the terminals of the loader field 46 in order to completely unload the apparatus without risk of letting the condenser field 45 drop out of step with consequent disturbance of the circuit when load is again thrown on. In practice it will probably be found that such minor internal adjustments of a semi-permanent nature may be taken care of by use of resistor 51 or automatic relays installed across one or both fields and built into the structure of the control rotor 43, in which case the two field circuits 45 and 46 might be connected either in series or multiple across one set of slip rings, somewhat simplifying the construction of the machine. In any case, after these semi-permanent adjustments have once been determined by test and fitted, the unit may be completely regulated, loaded or unloaded at will instantly by varying one resistor in the exciter circuit, preferably in the exciter field.

The loader field 46 and the condenser field 45 are connected in series to a source of direct current. A conductor 52 connects a source of direct current 53 with slip rings 54, which are connected with the field 45. A conductor 55 connects with the slip rings 57, which are connected to the loader field 46. A conductor 58 connects the slip rings 57 with the source of direct current 53. Preferably a small shunt resistor 51 connects conductors 58 and 55, permitting relative adjustment of the excitation of the winding 46 as respects the excitation of the winding 45. The short circuiting switch 50 is also preferably interposed between conductors 58 and 55, permitting complete deenergizing of the winding 46 without completely deenergizing the winding 45.

After the relative strength of the winding 46 and the winding 45 has been adjusted, all ordinary load regulation is then readily effected by varying a small resistor 59 in the field of the source of the direct current generator 53, thereby varying the output of said exciter or direct current generator.

In addition to regulating the flow of load current in its own windings and in the windings of a slip ring induction motor connected in circuit with its primary or condenser winding, as in Fig. 6, this regulator is further adapted to govern the performance of another ordinary alternating current motor connected through conductors 60 to the slip rings 42 to its secondary or loader winding 41. Thus, if desired, it is perfectly practicable to arrange a plurality of machines in cascade connection, for example, in Fig. 7, four machines are shown. A slip ring motor 61 has its primary connected to a source of alternating current (not shown) through conductors 62. The secondary of the motor 61 is connected by conductors 63 to the primary of a regulator 64, the loader terminals of which are connected by conductors 65 to a second slip ring induction motor 66 similarly connected to a second regulator 67. The loader and condenser fields of the two regulators 64 and 67 are connected in circuit to an exciter similar to the connections shown in Figs. 2 and 6, previously described. Thus, we obviously have a plurality of driving shafts all governable through the one exciter field. In the above, I have indicated two induction motors in combination with two regulators, but all of the members might be regulators.

In any such group of motors arranged for collective drive and governed by one or more regulators, it is clear that the maximum or synchronous speed of the group will depend upon the total number of all primary poles modified by the ratio between the number in the primary or condenser and secondary or loader couples of the regulators. If the primary couples have more poles than the secondaries, under starting conditions in such a group (each succeeding regulator of the series will transmit to the unit following, a current somewhat larger than it receives, but of lower frequency. Thus at low speeds heavy starting torques may be developed with relatively small currents drawn from the suppy mains, each succeeding member of the series yielding a torque according to the strength of current in its windings, free from the power factor derangement which, in present practice, renders concatenation of induction motors impracticable. The synchronous speed of any such group (Fig. 7) is the speed at which the last member of the series is in synchronism with the frequency impressed upon it. Any such group driven above that speed will regenerate precisely like an induction motor driven above synchronism. If the primary windings of the several members of such a group have all a like number of poles, obviously it is possible, by changing connections, to provide a variety of group speeds very much as with direct current motors in series, multiple-series and multiple connection.

The condenser field 45 functions chiefly to control or correct the power factor of the primary circuit. When this control is of minor importance, or where a synchronous machine is considered undesirable, the synchronous condenser field 45 may be replaced by a squirrel cage or other winding in inductive relation to the primary 40, in which case the primary condenser couple becomes a primary inductive couple. Such a modified form would obviously be preferably in any service requiring frequent reversals or changes of connections to obtain various group speeds.

Similarly the distributed polar winding of the loader or secondary winding 41, with terminals brought out to slip rings 42, serves chiefly to render the slip energy of the secondary circuit available for utilization in some outside circuit, i. e., for cascade connection with another motor. In small units where low initial cost, rugged construction and simplicity are of more importance than efficiency, or in units which, at nearly all times, will operate at practically full synchronous speed, or with small speed variations, the distributed winding with its slip rings may be replaced by a squirrel cage winding as shown in Fig. 6.

In all induction motors the electrical input, or energy drawn from the supply circuit is measured by rotor torque multiplied by the synchronous speed. The mechanical output of the motor is measured by the rotor torque multiplied by the shaft speed. The difference, commonly called slip energy, appears as alternating currents in the secondary circuit. At fractional speeds all induction motors fail to utilize this slip energy, it is dissipated as heat and wasted, and the motor functions with poor efficiency. In this respect the regulator (Figs. 2 and 3) is much like a slip ring induction motor, and is similarly handicapped. By itself alone, it offers no better solution excepting the clumsy and rather unsatisfactory method above discussed requiring group connection of several motors in cascade with switching operations to obtain varying group speeds. Accordingly, a general satisfactory method of alternating current motor drive, providing adjustable load control with economy at varying speeds requires some additional device, supplementary to the regulator, operable in combination with the regulator, and adapted to conserve the slip energy appearing in the secondary or loader circuit thereof. A major part of this invention relates to such a device, hereinafter designated as a differential member or device, a simple elementary form of which is illustrated in Fig. 8.

The differential device here shown has two principal parts, viz; a driving shaft 68 and a driven shaft 69 and, operatively interposed between them, a third intermediate shaft 70, freely rotatable with respect to both of the shafts 68 and 69. Fixed upon the driving shaft 68 is mounted a driving rotor 71 formed with salient poles 72 wound for excitation by direct current, the terminals of this exciting winding being connected by conductors 73 to slip rings 74 on the driving shaft 68. On the driven shaft 69 also is fixed a driven rotor 75 formed with a laminated magnetic core 76 fitted with a squirrel cage winding 77 like the rotor of an ordinary squirrel cage induction motor. The rotor 75 has a diameter considerably greater than that of the set of field poles 72. Upon the shaft 70 are fixed two mounting members 78 and 79, having unequal diameters but having annular laminated magnetic structure 80 and 81, respectively. Polyphase polar windings 82 and 83 are distributed in slots on the respective inner peripheries of magnetic structures 80 and 81, similar to the stator windings of ordinary synchronous or induction machines. Mounting member 78 is of lesser diameter than member 79. The windings 82 are operatively disposed in close inductive relation to the set of field poles 72, and said windings and field poles in combination constitute a couple, functioning like a synchronous alternating current generator. This couple will hereinafter be designated as the generative couple. The other mounting member 79, of the greater diameter, is wound with a larger number of poles and is operatively disposed in close inductive relation to the squirrel cage 77. The windings 77 and 83, likewise constituting a functional unit, will hereinafter be designated as the motive couple. The generative couple and the motor couple are wound with unequal numbers of poles, the generative couple having a lesser number, distributed about an airgap of lesser diameter. The two couples are however of approximately equal volt-ampere capacities. The armature circuit of the generative couple is closed through the primary circuit of the motive couple by the conductors 84, so that any alternating current induced in either couple, due to relative motion between its winding elements, must of necessity circulate through both couples. The several phases will be so interconnected that the rotative magnetic fluxes set up in the two couples will revolve in the same direction but necessarily with unequal velocities.

If now, the winding 85 of poles 72 of the generative couple is excited by direct current, through conductors 86, any relative motion or difference in speed, between the driving shaft 68 and the driven shaft 69 will induce in the armature of the generative couple an alternating current, accompanied by a torque tending to drag the intermediate shaft 70 in the same direction as the rotating driving shaft 68. The current induced in the generative couple by slip between its winding elements appears in the primary of the motive couple, which, functioning as an induction motor, will develop a torque tending to drive the driven shaft 69 in the same direction as the driving shaft 68. If the load is too heavy and the shaft 69 fails to start, then said torque will drive the shaft 70 backward in a direction counter to the torque of the generative couple. The motive couple, having the greater number of poles, arranged about an airgap of greater diameter and with lesser angular velocity, will develop a moment of torque between shafts 69 and 70 considerably greater than that of the opposed torque moment of the generative couple between shafts 68 and 70. This greater torque must prevail, driving the shaft 70 counter to the torque in the generative couple with consequent increasing frequency in the conductors 84 and in the windings 82 and 83 of the two couples, hereinafter called the differential circuit. This increase in frequency will further accelerate the motive couple and with it the backward movement of the generative couple. The motive couple, having a greater number of poles than the generative couple, will approach synchronism with the increasing frequency of the differential circuit faster than that frequency increases by reason of the backward acceleration of the generative couple. For any given difference in speed of the shafts 68 and 69, there is some certain definite speed of the intermediate shaft 70 relative to each of the shafts 68 and 69, and a certain corresponding frequency in the differential circuit, at which both the motive couple and the generative couple will be in synchronism with the differential circuit. Neglecting slip, the intermediate shaft 70 will tend to approach and maintain that synchronous speed, the motive couple functioning as an induction motor at approximately synchronous speed, driving the generative couple backward against its own torque so that it functions as a synchronous alternating current generator. This arrangement serves to convert the energy represented by the total slip between the shafts 68 and 69 into electrical energy of good power factor in the differential circuit, which energy, in the motive couple, is again converted with good efficiency into mechanical energy applied upon the shaft 69.

Assuming a given slip, or difference in speed between the shafts 68 and 69, it follows that the greater the ratio between the number of poles in the motive couple and the number in the generative couple, the less will be the frequency in the differential circuit to maintain both the generative and motive couples in synchronism. Or, assuming a given pole ratio between the two couples, it follows that the greater the difference in speed between the shafts 68 and 69, the greater will be the slip between the winding elements of such couple and the resulting frequency in the differential circuit, necessary to maintain synchronism between the motive and generative couples. This differential device comprising the two differentially connected dynamo-electric couples mechanically linked together, serves as an elastic coupling between the driving shaft 68 and the driven shaft 69, affording a convenient and efficient channel through which energy may be transmitted between two shafts. The net result of the action of this differential device is to reduce to a minimum any relative motion between driving and driven shafts, i. e., to cause those shafts to assume approximately identical motions.

The differential device is applicable as a connecting means between driving and driven shafts regardless of the speed of the driving shaft. A source of direct current 88 is connected through a variable resistance 87 with conductors 86, thence with slip rings 74 and thence with windings 85. By adjusting the strength of the direct current on conductors 86, as by the variable resistance 87, the strength of the field in the generative couple may be adjusted. The adjustment of the strength of the field in the generative couple governs the power generated by reason of slip between the parts of the generative couple. This provides for using the slip energy developed in the secondary circuit of a regulator device hereinbefore described, and converting the same into useful effort upon the load. In other words, my invention makes it possible to elastically connect a source of power to a driven load through a wide range of variable speed ratios.

This differential device is adaptable to a great many modified forms of embodiment. In Fig. 8, the generative couple is of the synchronous type and the motive couple of the inductive type. As shown in Figs. 4, 5, 9, 10 and 11, the differential device may embody a plurality of synchronous or of inductive type couples. Couples of other types also might be substituted. For instance, couples of winding elements provided with commutators and using direct current might be employed in a similar manner.

In Fig. 8, the distributed polar windings or armatures of both couples are mounted both on the intermediate shaft 70 and the other complementary winding of each couple is mounted on either the shaft 68 or 69. Clearly, the relative position of the winding elements of either couple may be reversed without modifying the operation of the device. In Fig. 8 the driving shaft 68 and the driven shaft 69 are each revolving and the power transmitted by the differential device is received and delivered mechanically. As shown in Figs. 1, 4, 5, 10 and 11, this power with equal facility may be received or delivered electrically. The only links actually connecting the driving and driven parts to the intermediate part are two unlike magnetic fields. The particular mechanical means or type of circuit employed to excite or regulate the intensity or motion of either field is of minor importance. As shown in the accompanying figures, either of these fields may under suitable circumstances, be excited or regulated either by salient synchronous poles energized by direct current or by distributed polar windings energized by alternating currents, and either type of winding may be fixed upon parts either stationary or rotatable.

Considered mechanically, a unique and notable feature of this device resides in an intermediate part, hereinafter called the differential intermediate part, which is freely rotatable with respect to and operatively interposed between two members in such a manner that it serves as a channel through which energy may be efficiently transmitted from one member to the other. One of these two members, called the driving part, affords the means by which energy, either mechanical or electrical, is received by the apparatus from an outside source. The other member, herein called the driven part, affords suitable provision for absorbing this energy and electrically or mechanically applying the same upon a load. In many forms of embodiment, the two members will be interchangeable in function.

Mounted rigidly upon the intermediate differential part are two winding elements for electric current, each fitted to a suitable magnetic core. Upon each of the driving and driven members also is mounted a magnetic structure with a winding element fitted thereto. Of the two winding elements on the intermediate differential part, each is operatively disposed in close inductive relation to a winding element on either the driving or driven members.

Considered electrically, these four winding elements, thus paired, constitute two dynamo-electric couples of two winding elements each corresponding to the field and armature. These two couples are linked together mechanically by virtue of the fact that each has one of its winding elements rigidly fixed upon the intermediate differential part. The other winding element of each couple is rigidly fixed upon either the driving or driven member. These two couples will be approximately equal in volt-ampere capacity but it is essential that they differ in the turning moment which they respectively apply to the intermediate differential part. This may be accomplished, for example, by providing a difference in the number of poles, or in the manner in which they are mechanically connected to the several rotating parts. The couple, developing the greater moment of torque, will prevail over the other, and being mechanically linked to it, will drive that other couple as a generator. The two couples are also electrically interconnected either directly or indirectly in such a manner that any electrical energy, generated in either couple due to relative movement of its winding elements, will necessarily appear in the other couple. Care should be taken that the phase rotation in the two couples is such that the torques developed therein are pitted against one another, tending to drive the differential part in opposite directions. The characteristic action of this differential device is to absorb all energy, available by reason of any difference in motion of the two magnetic fields respectively interlinked with the winding elements of the two couples, and to convert that energy into an elastic electromagnetic strain between those two fields, which strain tends to modify the motion of both, so that their difference in motion will vanish and the two magnetic fields will assume like rotary motions.

Figure 4:
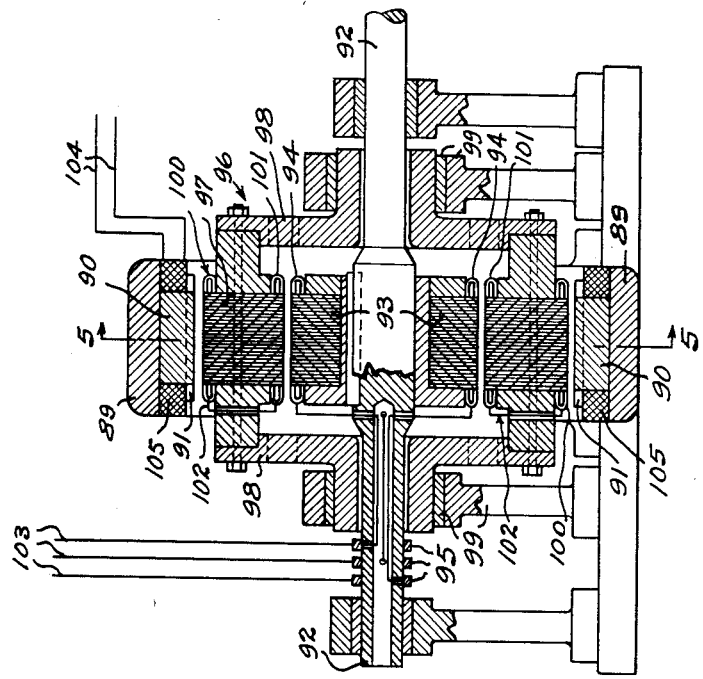
Fig. 4 is a vertical sectional view of the differential member shown in Figure 1, with parts in elevation and with the electrical circuits indicated diagrammatically.
Figure 5:
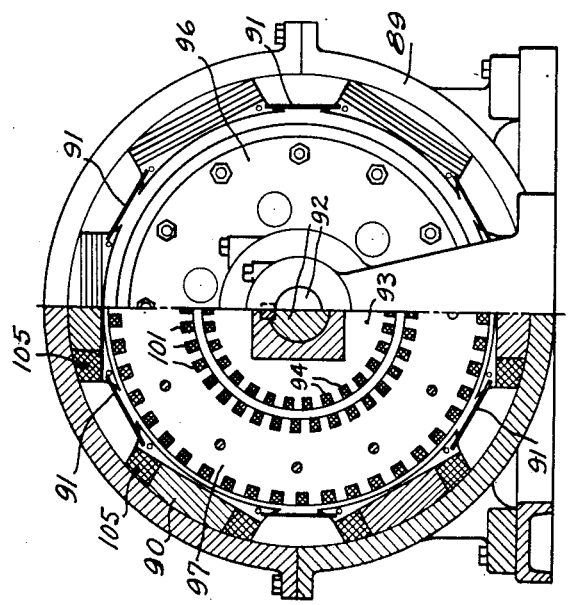
Fig. 5 is a view partly in section and partly in elevation on broken line 5—5 of Fig. 4.

Any alternating current generator or motor, i. e., dynamo-electric machine embodying this differential device will hereinafter be designated as a differential machine, as distinguished from a synchronous or ordinary induction machine. A preferred exemplary form of such a machine is represented in Figs. 4 and 5. This machine has a stator similar somewhat to the stator of an ordinary rotary converter. This stator comprises a frame 89 of magnetic iron with a set of inwardly pointing salient poles forming a stator field 90 wound for excitation by direct current. The stator field is preferably provided with a starting winding 91. It has a driven part or load shaft 92 upon which is fixed a laminated magnetic core 93 with a distributed polar winding 94 brought out through the hollow shaft to slip rings 95. The slip rings 95 are connected to a suitable source of alternating current power, and when used in the compound unit shown in Fig. 1, are connected to the slip rings 42 of the regulator by conductors 103. Operatively interposed

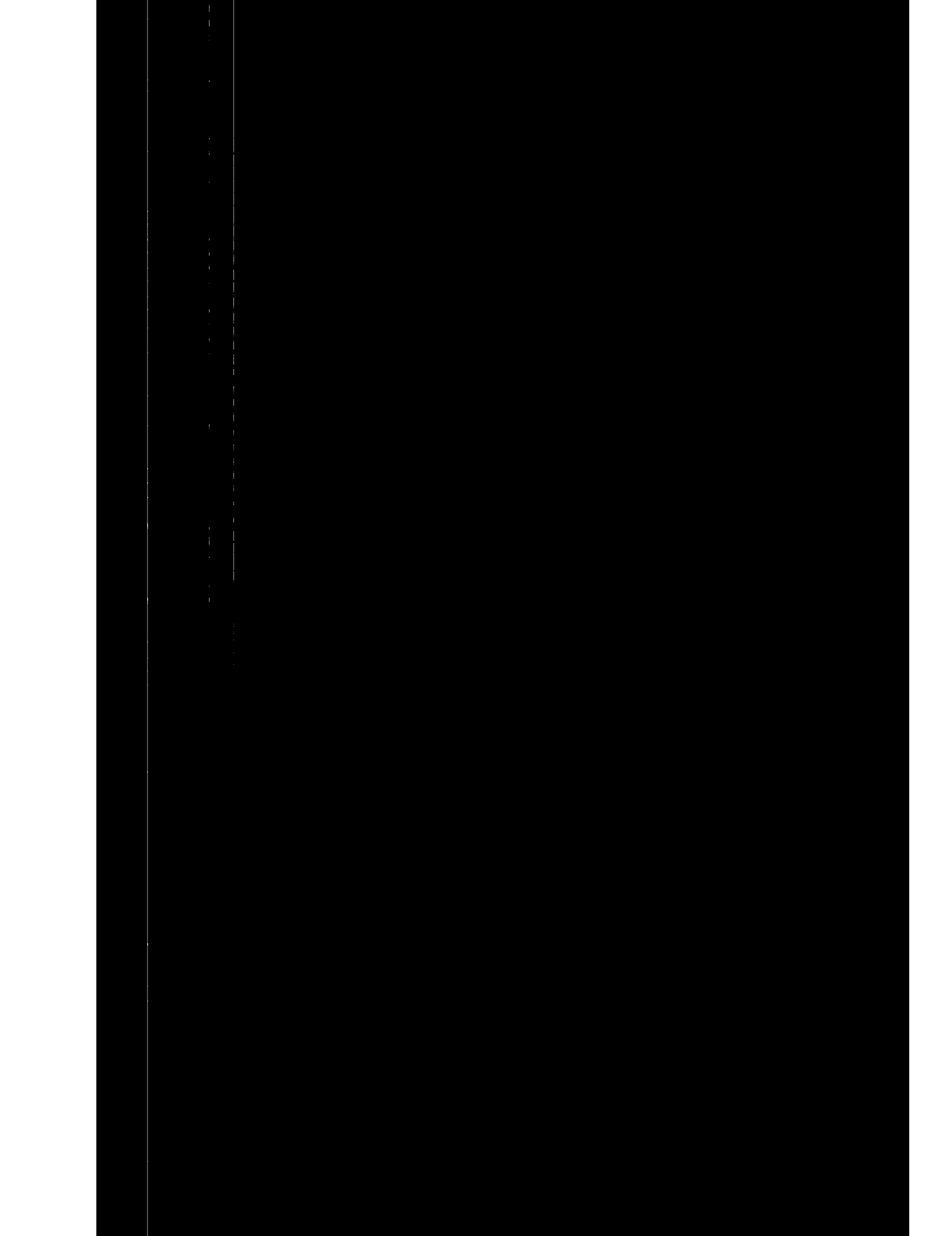

danger of causing it to fall out of step, as hereinbefore explained. Small switch 118 is provided in the stator field of the differential member. The loaded shafts 47 and 92 are connected by coupling 119. The respective phases of the circuit through conductors 103 are so interconnected that the phase rotation in the two members, the regulator and the differential, is such that the torques developed on the shafts of the respective members are additive.

Figure 1 illustrates a compound alternating current dynamo-electric machine of the rotary field type providing complete adjustable regulation over load current, torque and power factor at all operating speeds (below and above synchronism) of the loaded shaft 92 of the differential, and shaft 47 of the regulator. At any speed less than synchronism it operates as a motor and even when stalled or driven backward by the load, it will neither drop the load nor short circuit the supply circuit, but the two intermediate freely revolvable rotors 43 and 96 will merely turn with increasing velocity with increasing slip. If mechanically driven at speeds above synchronism it will function as a generator, the said rotors 43 and 96 slipping in the other direction. In either case the torque, and the power transmitted thereby being governable at will by merely varying the strength of the field of the exciter 110 by varying the resistance of the rheostat 116. The unit here represented is of such a type as might be employed to drive large pumps or compressors for air or ammonia, tram cables or any load involving large starting torque, or wide variations in load torque and speed but not requiring frequent quick reversal.

To start the apparatus, the switch 117 (Figure 1) is closed and the exciter field killed by putting a large resistance in the rheostat 116. Then by use of the small starting compensator 108, the control rotor 43, Figs. 1, 2 and 3 of the regulator is started from rest brought up to synchronous speed and connected direct to the line 109. The exciter 110 is then slightly energized by cutting some resistance out of rheostat 116, thus moderately exciting the condenser field poles 45 of the regulator which will drop into step and run in synchronism with the supply circuit 109. When ready to apply the load, the short circuiting switch 117 is opened, thus slightly exciting the loader field 46, inducing in the secondary or loader winding 41 an alternating current of half the primary frequency. This current passing through the conductors 103 to the differential member will cause the differential rotor 96 to start and approach its synchronous speed. Thereupon, the switch 118 may be closed mildly exciting the stator field poles 90 of the differential member, so that the differential rotor will drop into step therewith. The above operation will involve the production of a moderate torque but hardly sufficient to start any considerable load from rest. When the foregoing operation is completed, the machine is ready to assume any desired load at once. This load may be applied by merely cutting resistance out of the rheostat 116 in the exciter field. With increasing exciter voltage, the magnetic intensity of the loader field poles 46 of the regulator will stiffen, thus increasing the slip energy delivered by the circuit through conductors 103, Figure 1, to the differential member and with it the torque in both members will stiffen. At the same time the condenser field automatically strengthens, improving rotor torque and power factor in regulator, and the stator field of differential stiffens maintaining good power factor in the differential circuit.

To render the compound unit shown in Figure 1 quickly reversible, it is only necessary to replace the salient pole, synchronous condenser field 45 on the control rotor of the regulator, by a heavy squirrel cage winding in close inductive relation to primary stator winding 40 of the regulator, and to provide a reversing switch (not shown) in one phase of the circuit through conductors 107. Such a machine for a given power would lack the means of correcting power factor in the supply circuit. It would, however, be somewhat simpler in operation and construction, and more fool-proof.

A modified form of the device shown in Fig. 8 appears in Fig. 9, wherein the generative couple is formed of two concentric rotors, freely rotatable with respect to each other. One rotor 120 is keyed to a driving shaft 121, which is connected to a source of mechanical power. The rotor 120 is provided with a set of salient poles 122 excited by windings 123, the terminals of which are connected to slip rings 124. Also, on shaft 121 is mounted a freely rotatable drum shaped rotor 125 comprising a laminated annular magnetic structure 126 mounted between supporting members 127 and 128. On the inner periphery of the magnetic structure 126 is a distributed polar winding 129 in inductive relation with the poles 122 and in combination with those poles constituting the generative couple. This winding 129 is connected by conductors 130 to the slip rings 131 on the hub of supporting member 127, while on supporting member 128 is fixed a gear 132. The motive couple in this modified form is incorporated in rotor structures 133 and 134 mounted on driven shaft 135. These rotor structures and their mountings may be precisely similar to rotors 120 and 125 immediately above set forth. Rotor 133 keyed to shaft 135 has salient poles 136 excited by windings 137, the terminals of which are connected to slip rings 138. These rings, together with slip rings 124 are connected by conductors 139, 140, 141 to a source of direct current (not shown) through a variable resistor 142. Also on shaft 135 is a freely rotatable drum shaped rotor structure 134, comprising a laminated annular magnetic structure 143 mounted between supporting members 144 and 145. On the inner periphery of this magnetic structure is a distributed polar winding 146 in inductive relation to the poles 136. This winding 146 is connected by conductors 147 to slip rings 148 on the hub of one supporting member 144, while on supporting member 145 is fixed gear 149 intermeshing with gear 132. These two gears 149 and 132 are of unequal pitch diameters. This difference in gears is the only mechanical feature in which the driving shaft and the rotor structure mounted thereon differs from the driven shaft and the rotor structures mounted thereon. Slip rings 148 and 131 are interconnected by conductors 150 with such phase rotation that the torques applied to the gears 132 and 149 are opposed or countered.

The construction of this modified form differs only from that form shown in Fig. 8 in the following respects: In Fig. 8 the motive couple is of the squirrel cage induction type and the generative couple is of the synchronous type, while in Fig. 9 both couples are of the synchronous type. In Fig. 8 the difference in torque movement is obtained by making the motive couple of larger number of poles and longer diameter than the generative couple. In Fig. 9, the two couples, while alike themselves in construction, are mechanically interconnected through gears of unequal pitch diameter. Obviously, the couple having the smaller gear will develop the larger torque moment and will function as the motive couple. This forms of embodiment is manifestly reversible, either shaft being employable as the driven or driving shaft.

Fig. 10 shows a modified form of the differential member shown in Figs. 1, 4 and 5, but operated on a circuit of limited or regulated power. A shaft 151, which may serve as the driven shaft, is provided with a rotor 152, which is fitted with a set of field poles 153, as the device in Fig. 9, the terminals of the exciting winding 154 thereof being connected by conductors 155 to the slip rings 156.

A drum shaped differential rotor 157, freely rotatable on shaft 151, comprises an annular laminated magnetic structure 158, which is mounted between supporting members 159 and 160. On the inner periphery of this magnetic structure 158 is a polyphase distributed polar winding 161 in inductive relation to the field poles 153. This winding 161 and pole 153 constitute the generative couple of this device. On the outer periphery of said magnetic structure 158 is a second polyphase distributed polar winding 162, having a larger number of poles than winding 161. Windings 161 and 162 are connected by conductors 163 and together constitute the differential circuit, the phase rotation in both said windings being in the same direction about the rotor 157.

Stator 164 (similar to the stator of an ordinary induction motor) has laminated magnetic structure 165, on the inner periphery of which is the distributed polar winding 166, having the same number of poles as winding 162 and disposed in close inductive relation thereto. These two windings 166 and 162 constitute the motive couple of this device. The terminals of this stator winding 166 are connected by conductors 167 to the armature terminals of an ordinary synchronous alternator 168 (not shown in detail because it is of well known standard ordinary construction). This alternator has driving shaft 169, which is the driving shaft and which is connected to some source of mechanical power (not shown). The exciting field circuit of this alternator has slip rings 170. These rings 170 and rings 156 are interconnected by conductors 171. Conductors 172 and 173 connect said rings to a common direct current exciter 174. If desired, an adjustable shunt resistor 175, may be connected across either pair of slip rings to permit relative adjustment of the respective fields. Also a small rheostat 176 in the field circuit of the exciter 174 affords the regulating means for controlling the flow of power between the driving shaft 169 and the driven shaft 151. Clearly, if the two stators have the same number of poles, the two shafts 169 and 151 will be electrically so coupled together that they will tend to turn at approximately the same speed, the driven shaft lagging somewhat behind the driving shaft with a slip which will vary with the load torque and with the excitation of the exciter 174. By varying the resistance of a small rheostat 176 in the field of this exciter 174, the driven shaft 151 may be driven with good efficiency at any desired speed less than that of the driving shaft 169 and at any desired torque within capacity of apparatus. This arrangement is reversible, i. e., either shaft may be the driven and the other the driving shaft. By introducing a reversing switch 177 in one phase of the connecting circuit through conductors 167, the rotation of the driven shaft also may be reversed. This embodiment of my invention is obviously particularly well adapted to marine propulsion, the synchronous machine being mechanically coupled to the prime mover and the differential machine to the propeller.

Fig. 11 represents another compound unit embodying my invention in a modified form. A stator 178, similar to the stator shown in Figs. 2 and 3, is provided with a laminated magnetic structure 179, having on its inner periphery distributed polar winding 180. The terminals of these windings are connected by conductors 181 to a polyphase alternating current circuit. A drum shaped rotor 182 is freely rotatably mounted upon shaft 183, comprising an annular mounting means 184, supported between members 185 and 186. Upon the outer periphery of annular mounting means 184, are disposed a set of salient field poles 187 excited by winding 188. These windings 188 are connected by conductors 189 to slip rings 190. On the inner periphery of annular member 184 are disposed salient poles 191 excited by windings 192. These windings are connected to slip rings 193 by conductors 194. Rotor member 195 is keyed to shaft 183, and on this rotor is a magnetic structure 196, having on its outer periphery polar windings 197 in inductive relation to salient poles 191. Windings 197 and 192 constitute the loading couple of this regulator, while windings 180 in combination with salient poles 187 constitute the primary or condenser couple of this regulator. This loader winding 180 is connected by conductors 198 to slip rings 199.

A second regulator, similar in type to that just described, has a stator 200 comprising a magnetic structure 201 provided with distributed polar windings 202. The terminals of this stator winding 202 is connected by conductors 203 to another polyphase alternating current circuit. An intermediate control rotor 204 is freely revolvably mounted upon shaft 205, said rotor comprising an annular mounting member 206 supported by members 207 and 208. On the outer periphery of annular member 206 are salient poles 209 excited by windings 210. These poles are in inductive relation to stator windings 202. Being in inductive relation this would also mean that there were the same number of poles in 209 as in windings 202. The field poles 209 and stator winding 202 constitute the primary or condenser couple of this regulator. Windings 210 are connected by conductors 211 to slip rings 212. On the inner periphery of annular member 206 are disposed salient poles 213 excited by windings 214. These windings 214 are connected by conductors 215 to slip rings 216. On shaft 205 a rotor member 217 is fixed with a magnetic structure 218 having polar windings 219. These polar windings are connected by conductors 220 to slip rings 221. These distributed windings 219 are in inductive relation with salient poles 213 and constitute therewith the loader couple of this regulator.

Shafts 183 and 205 are mechanically integrally connected through coupling 222. Slip rings 221 are electrically connected by conductors 223 to slip rings 199. Control rotor 204 is shown here as of larger diameter than control rotor 182. The number of poles 213 is greater than the number of poles 191. Rotor 217 is of a larger diameter than rotor 195 and the windings 219 have a larger number of distributed poles than has the winding 197. Since rotor 195 and rotor 217 have their respective shafts 205 and 183 mechanically connected, and their windings electrically connected by conductors 223 they together constitute a modified form of the differential rotor, similar in operation to differential shown in Fig. 8.

Slip rings 190, 193, 212 and 216 are interconnected by conductors 224 and conductors 225, 226 and 227 to a common exciter 228. Adjustable shunt resisters 229 and 230 may, if desired, be fitted to conductors 224 and 225, and 224 and 226. A small rheostat 231 in the field of the exciter 228 constitutes means for regulating the intensity of the exciting current of the salient polar windings, and, therefore, means for controlling the flow of power through the compound unit.

This unit differs from the others in that it both receives and delivers its power electrically. It receives alternating current of one frequency from a suitable circuit and delivers alternating current at any convenient frequency through a wide range. Manifestly, mechanically the unit here represented consists of two regulator members, each similar in type to the device shown in Figs. 2 and 3, except that in this instance the control rotor of each regulator is supported by bearings fitted to and resting on a common shaft formed by mechanically uniting integrally shafts 205 and 183. These two regulators are alike in type and in volt ampere capacity and their load shafts are coupled together mechanically so that they must turn at the same speed. But, the two machines differ from each other in the diameters of their loaded rotors and in the number of poles in the secondary or loader windings thereof, and therefore, in the rotative speeds of their respective control rotors. In operation, the two condenser fields perform their previously described normal function, i. e., regulating the power factor of the respective alternating current circuits with which they are in inductive relation. Obviously, the condenser field of each machine and the control rotor upon which it is mounted will revolve in synchronism with the circuit to which that machine is electrically connected. It is, therefore necessary in any particular application of this device, to so design the two machines with respect to the number of poles in the primary couples, i. e., stator thereof, that the driving member, or the member connected to the supply circuit shall have a higher synchronous speed than the driven member connected to the receiving circuit.

This modified form is particularly adapted to interconnect two independent alternating current power circuits, and provide a controlled and directed flow of electric power between said circuits.

In the described mode of operation of my invention, I have set forth possible theoretical scientific explanation thereof, but I wish it to be understood that I am not to be limited to any such theoretical explanation of my invention.

The invention deals primarily with a novel method of conversion or transmission of power. This method employs a new working cycle comprising a definite sequence of co-ordinated energy transformations, which sequence takes place in every embodiment of my invention. The operation of this cycle does not require any fixed inflexible relation between the speed or frequency of the driving agent and that of the driven load; and for this reason the cycle appears admirably adaptable to any type of apparatus wherein a flexible variability in that relation is desirable or necessary.

This method requires some part of the flow of energy, in its passage from the source of power to the load, to be transmitted successively through two separate and distinct magnetic fields, one of which is dynamically linked to the driving agent and the other to the load, so that their relative motion is a function of the slip or difference in motion between the driving agent and the load. While these two fields are relatively rotatable, they are interlinked dynamically by a closed dynamic circuit, i. e., by two parallel or alternative paths through either or both of which energy may flow from one field to the other. Thus these two fields, interlinked by a closed dynamic circuit, and respectively linked dynamically to the source of power and to the load, provide a through channel for the flow of power.

Of the two parallel, alternative paths constituting the aforesaid closed dynamic circuit, one (herein designated as the differential circuit) is electrical, and provides a means whereby a certain component of the supplied power may be efficiently converted first into electrical energy and then reconverted into effective mechanical effort upon the load. The alternative or parallel path is mechanical (the freely rotatable differential rotor) and provides a means of setting up a mechanical torque between the two fields and thereby transmitting another power component mechanically from one field to the other, the direction and volume of the power thus transmitted being a function of the motion of the differential rotor.

In any variable speed transmission the power supplied by the driving agent may be resolved into two components. Of these, one we may designate as the load component and this may be roughly measured by the product of the driving torque into the load speed. The other may be called the slip component and it may be roughly measured by the product of the driving torque into the slip, i. e., the difference in angular motion between the driving agent and the load. The function of the two parallel, alternative paths constituting the closed dynamic circuit interlinking the two magnetic fields above mentioned may be regarded as that of segregating these two components and so dealing with each that both may be employed effectively.

In every form of my invention shown, there is a part which I call the differential member or differential device, which part provides a structural embodiment of the said two parallel alternative paths of the closed dynamic circuit, which two paths are necessary in the operation of the working cycle. Fig. 8 illustrates this differential device in perhaps its most rudimentary form. Figs. 1, 4, 5, 9, 10 and 11 show modified arrangements of the elements of this device with accessories adapting it to various types of service.

In every form of the differential device shown (illustrated in every figure except 2, 3, 6 and 7 which deal only with the regulator member), the following cycle of energy transformations is carried out: these steps will be illustrated by reference to Fig. 8 on account of the simplicity of the device there represented.

*Step #1.*—The supplied or transmitted power is converted into the form of magnetic energy, embodied in a rotative magnetic field.

In Fig. 8 the rotary mechanical energy of the driving shaft 68 is converted into magnetic energy of a rotating magnetic flux which permeates and interlinks the salient poles 72 of the driving rotor and the laminated core 80 of the differential rotor 70.

*Step #2.*—A certain component of the power thus delivered to said rotative magnetic field is converted into electrical energy, represented by current in the differential circuit.

In Fig. 8 the relative motion of the poles 72 with respect to the windings 82 of the differential circuit serves to induce in those windings alternating currents which obviously represent power delivered through the driving shaft 68.

*Step #3.*—This electrical energy is reconverted into magnetic energy of a second magnetic field, the relative motion of which, with respect to the first rotative magnetic field aforementioned, is a function of the slip between the driving agent and the load.

In Fig. 8 the currents induced in windings 82 pass via conductors 84 of the differential circuit into the distributed polar winding 83 and there serve to energize a second magnetic field permeating the laminated iron cores 81 of the differential rotor and the laminated core 76 of the driven rotor 75. Owing to the dynamic reaction between said second magnetic field and the currents induced in the squirrel cage 77 of the driven rotor, it follows that the said second magnetic field and said driven rotor 75 together with attached driven shaft 69 will be constrained to assume almost identical angular speeds, their motions differing only by a small slip as in an ordinary induction motor at full speed.

*Step #4.*—A second component of the transmitted power is converted into the form of rotative mechanical energy appearing as a torque moment mechanically transmitted by means of the freely rotatable differential rotor.

In Fig. 8 the dynamic reaction between the magnetic flux issuing from the poles 72 and the currents induced thereby in windings 82 will clearly develop a torque moment tending to drive the spider 78 of the differential rotor forward with the motion of the driving shaft 68. This torque is transmitted mechanically via the differential shaft 70 and the spider 79 direct to the second magnetic field, modifying the motion and power thereof. The component of power transmitted by virtue of this torque will at any instant vary with the motion of the shaft 70. If this shaft has some motion forward with the driving shaft 68 it is clear that a component of the supplied power is being mechanically transmitted from the spider 78 to the spider 79 modifying the motion of the second field. But if the shaft 70 has a backward motion counter to that of the driving shaft 68, it means that the mechanical flow of power via shaft 70 is reversed, that not all the energy delivered electrically via the differential circuit 84 is being absorbed by the load, but a certain portion is being returned to the spider 78. It will be observed that this returning component manifests itself as a backward motion of the magnetic core 81 as respects the driven rotor 75, furthermore that the amount of this backward motion is just sufficient to permit the squirrel cage winding 77 of the driven rotor to fall into step with the second magnetic field. Also note that this backward motion of the shaft 70 increases the relative motion between the poles 72 of the driven rotor and the windings 82 of the differential circuit, thereby converting itself automatically into an increment of electrical energy in the differential circuit 84. Inasmuch as all the electrical energy in the differential circuit 84 is delivered directly to the second magnetic field, and this second magnetic field is rotating in step with the driven rotor and the load, it becomes apparent that by the operation of this cycle of transformations, my differential transmitting device is enabled to absorb energy from a source of power at supply speed or frequency and deliver this power to a load at load speed or frequency without losing or dissipating any material part thereof, except only those copper, iron, windage and frictional losses inherent in all dynamo-electric machines. Note further that any change in the relative speeds of the driving shaft 68 and the driven shaft 69 will result in a shift in the distribution of power between the electrical and mechanical components such that any loss in speed is automatically converted into an increase in torque or vice versa.

These above four steps constitute the working cycle upon which my invention operates. In the practical application of this cycle however to transmissions where the power required to drive the load is less than that available at the source of supply, it becomes necessary to introduce a fifth, supplementary step, to limit or regulate the volume of power flowing through the apparatus. In Fig. 8 this is accomplished by varying the intensity of the first mentioned rotary magnetic field, as by means of the variable resistor 87 in the circuit of the exciter 88. In general, similar adjustment of the intensity of one of the magnetic fields affords a convenient means of such regulation.

Obviously, changes may be made in the forms, dimensions and arrangement of the parts of my invention, without departing from the principle thereof, the above setting forth only preferred forms of embodiment.

I claim:

1. A power transmitting and converting device comprising two relatively rotatable and inductively disposed winding elements forming a generator; two relatively rotatable and inductively disposed winding elements forming a motor with a magnetic field unlike in number of poles to the magnetic field of the generator; a variable output direct current exciting means for varying the strength of one of these magnetic fields; a mechanical mounting means linking one winding element of the generator with one winding element of the motor; mounting means for said other winding element of the generator; a separate mounting means for said other winding element of the motor mounting said other winding element of the motor for relatively free rotation as respects said other winding element of the generator; and an electrical connecting means linking one winding element of the generator with one winding element of the motor.

2. A power transmitting and converting device comprising two relatively rotatable and inductively disposed winding elements forming a generator; two relatively rotatable and inductively disposed winding elements forming a motor with a magnetic field unlike in number of poles to the magnetic field of the generator; a variable output direct current exciting means for varying the strength of one of these magnetic fields; an idle rotatable mechanical mounting means linking one winding element of the generator with one winding element of the motor; mounting means for said other winding element of the generator; a separate mounting means for said other winding element of the motor mounting said other winding element of the motor for relative free rotation as respects said other winding element of the generator; and an electrical connecting means linking one winding element of the generator with one winding element of the motor.

3. A dynamo electric power transmitting and converting machine comprising (a) a regulator member and (b) a differential member; said regulator member comprising a stator with a winding element; a load shaft axially disposed with respect to said stator; a load rotor fixedly mounted on said load shaft and provided with a winding element; an intermediate mounting means concentric with said shaft and idly rotatable with respect to both the shaft and the stator and provided with two winding elements, one operatively disposed in inductive relation to said stator winding and one to the load rotor winding; conductor means connecting one of the said winding elements to a source of alternating current, which winding element thereby becomes the primary winding of the regulator; direct current exciter means connected to one of the other winding elements not inductively disposed to the primary winding, such winding element thereby becoming the loader winding of the regulator; electrical transmission means connecting a third winding element, inductively disposed to the loader winding, to one winding of the said differential member, said third winding element thereby becoming the secondary winding of the regulator—the fourth winding being inductively related to the primary winding; said differential member comprising a stator with a winding element; a shaft to be driven at variable speeds axially disposed with respect to said stator; a load rotor fixedly mounted on said shaft and provided with a winding element; an intermediate mounting means concentric with said shaft and idly rotatable with respect to both the shaft and the stator and provided with two winding elements, one operatively disposed in inductive relation to the stator winding and the other to the load rotor winding; electrical conductor means connecting two of the said windings which are not inductively disposed to each other in closed circuit relation to constitute the differential circuit; said direct current exciter means connected to a third winding element; and electrical conductor means connecting the fourth winding element to the secondary winding of the said regulator.

4. A power transmitting and converting device comprising two relatively rotatable and inductively disposed winding elements forming a generator; two relatively rotatable and inductively disposed winding elements forming a motor with a magnetic field unlike in speed of rotation to the magnetic field of the generator; a variable output direct current exciting means for varying the strength of one of these magnetic fields; a mechanical mounting means linking one winding element of the generator with one winding element of the motor; mounting means for said other winding element of the generator; a separate mounting means for said other winding element of the motor mounting said other winding element of the motor for relatively free rotation as respects said other winding element of the generator; and an electrical connecting means linking one winding element of the generator with one winding element of the motor.

5. A power transmitting and converting device comprising two relatively rotatable and inductively disposed winding elements forming a generator; two relatively rotatable and inductively disposed winding elements forming a motor with a magnetic field unlike in speed of rotation to the magnetic field of the generator; a variable output direct current exciting means for varying the strength of one of these magnetic fields; an idle rotatable mechanical mounting means linking one winding element of the generator with one winding element of the motor; mounting means for said other winding element of the generator; a separate mounting means for said other winding element of the motor mounting said other winding element of the motor for relatively free rotation as respects said other winding element of the generator; and an electrical connecting means linking one winding element of the generator with one winding element of the motor.

6. A dynamo electric power transmitting and converting machine comprising (a) a regulator member providing a source of regulated power and (b) a differential member, said differential member comprising a stator with a winding element; a shaft to be driven at variable speeds axially disposed with respect to said stator; a load rotor fixedly mounted on said shaft and provided with a winding element; an intermediate mounting means concentric with said shaft and idly rotatable with respect to both the shaft and the stator and provided with two winding elements, one operatively disposed in inductive relation to the stator winding forming a first inductive coupling and the other operatively disposed in inductive relation to the load rotor winding forming a second inductive coupling; electrical conductor means connecting one winding element of the first inductive coupling with one winding element of the second inductive coupling in closed circuit relation to constitute the differential circuit; direct current exciter means connected to a remaining one of said winding elements; and electrical conductor means connecting the remaining winding element to the regulated power from said regulator.

7. In a dynamo electric power transmitting and converting machine, the combination of a stator with a winding element; a load shaft axially disposed with respect to said stator; a load rotor fixedly mounted on said load shaft and provided with a winding element; an intermediate mounting means concentric with said shaft and idly rotatable with respect to both the shaft and the stator and provided with two winding elements, one operatively disposed in inductive relation to said stator winding forming a first inductive coupling and the other operatively disposed in inductive relation to the load rotor winding forming a second inductive coupling; conductor means connecting one of the said winding elements of one inductive coupling to a source of alternating current, which winding element thereby becomes the primary winding of the regulator; direct current exciter means connected to one of the winding elements of the other inductive coupling, such winding element thereby becoming the loader winding of the regulator; and electrical transmission output means connected to a third winding element, inductively disposed to the loader winding, said third winding element thereby becoming the secondary winding of the regulator—the fourth winding being inductively related to the primary winding.

8. The method of transmitting and converting power electro-dynamically in a circuit wherein a generator having a primary winding element and a relatively rotatably inductively related secondary winding element is employed in combination with a motor having an externally excitable winding element and an inductively related relatively rotatable winding element and wherein the relatively rotatable winding elements of the generator and motor are mechanically interlinked, comprising the step of impressing a regulated alternating circuit E. M. F. on the primary winding element of the generator, whereby an E. M. F. is inducted in the relatively rotatable secondary of the generator; the step of impressing an exciting E. M. F. on the externally excitable winding element of the motor, whereby an E. M. F. is produced in the relatively rotatable element of the motor; the step of regulating said exciting E. M. F., whereby the E. M. F. in said secondary of the motor is regulated; and the step of electrically connecting in circuit the relatively rotatable winding element of the generator with the relatively rotatable winding element of the motor, whereby the E. M. F. in either rotatable winding element will circulate in the other.

BYRON E. SMITH.